(12) United States Patent
Huang et al.

(10) Patent No.: US 6,994,166 B2
(45) Date of Patent: Feb. 7, 2006

(54) COMPOSITION AND METHOD FOR DIVERSION AGENTS FOR ACID STIMULATION OF SUBTERRANEAN FORMATIONS

(75) Inventors: Tianping Huang, Spring, TX (US); Paul M. McElfresh, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 232 days.

(21) Appl. No.: 10/602,230

(22) Filed: Jun. 24, 2003

(65) Prior Publication Data

US 2004/0262002 A1 Dec. 30, 2004

(51) Int. Cl.
*E21B 43/27* (2006.01)
*E21B 33/138* (2006.01)

(52) U.S. Cl. ............... 166/282; 166/294; 166/300; 507/260; 507/265; 507/933

(58) Field of Classification Search ............... 166/270, 166/282, 283, 292, 294, 300, 400; 175/72; 507/138, 260, 265, 933, 934
See application file for complete search history.

(56) References Cited

U.S. PATENT DOCUMENTS

| | | | |
|---|---|---|---|
| 2,952,634 A * | 9/1960 | Lolkema et al. ............ 507/138 |
| 3,302,719 A | 2/1967 | Fischer | |
| 3,347,789 A | 10/1967 | Dickson et al. | |
| 3,374,835 A * | 3/1968 | Knox ........................ 166/282 |
| 3,709,300 A | 1/1973 | Pye | |
| 3,915,727 A | 10/1975 | Hunt et al. | |
| 3,998,272 A | 12/1976 | Maly | |
| 4,217,958 A * | 8/1980 | Doster et al. ............ 166/270.1 |
| 4,444,264 A | 4/1984 | Dill | |
| 4,455,241 A * | 6/1984 | Swanson ................... 507/211 |
| 4,526,695 A | 7/1985 | Erbstoesser et al. | |
| 4,527,628 A | 7/1985 | Dill et al. | |
| 4,579,667 A | 4/1986 | Lees et al. | |
| 4,586,568 A * | 5/1986 | Moradi-Araghi et al. ... 166/400 |
| 4,715,967 A | 12/1987 | Bellis et al. | |
| 4,848,467 A * | 7/1989 | Cantu et al. ................ 166/281 |
| 4,957,165 A | 9/1990 | Cantu et al. | |
| 4,986,355 A | 1/1991 | Casad et al. | |
| 5,028,341 A * | 7/1991 | Liao ........................... 507/120 |
| 5,647,900 A | 7/1997 | Persinski et al. | |
| 5,735,349 A | 4/1998 | Dawson et al. | |
| 6,239,183 B1 | 5/2001 | Dobson et al. | |
| 6,439,309 B1 | 8/2002 | Matherly et al. | |
| 6,632,778 B1 * | 10/2003 | Ayoub et al. ............... 507/202 |
| 2001/0053749 A1 | 12/2001 | Kilchrist et al. | |
| 2003/0139298 A1 * | 7/2003 | Fu et al. ..................... 507/200 |
| 2004/0173353 A1 * | 9/2004 | Todd ........................... 166/300 |

FOREIGN PATENT DOCUMENTS

WO PCT/US2004/019258    2/2005

* cited by examiner

*Primary Examiner*—George Suchfield
(74) *Attorney, Agent, or Firm*—Madan, Mossman & Sriram P.C.

(57) ABSTRACT

It has been discovered that solid, particulate dicarboxylic acids are useful as diverting agents in methods for acidizing subterranean formations to improve the uniformity of the acid treatments (acid displacement) by diverting acid to intervals of relatively less permeability. Particularly suitable solid, particulate dicarboxylic acids include, but are not necessarily limited to, those insoluble in both aqueous and hydrocarbon liquids, but which are soluble in mutual solvents or alcohol blends. These acids may have melting points of from about 180 to about 300° F. (about 82 to about 149° C.), formula molecular weights of from 146 to 400, and mesh sizes of from about 20 mesh to about 400 mesh (about 841 to about 38 microns). Particular dicarboxylic acids that fit this description include, but are not necessarily limited to, dodecanedioic acid, undecanedioic acid, decanedioic acid, azelaic acid, suberic acid, and mixtures thereof.

13 Claims, No Drawings

COMPOSITION AND METHOD FOR DIVERSION AGENTS FOR ACID STIMULATION OF SUBTERRANEAN FORMATIONS

FIELD OF THE INVENTION

The present invention relates to acidizing treatment methods used during hydrocarbon recovery operations, and more particularly relates, in one embodiment, to methods of and compositions for diverting the flow of fluids during hydrocarbon recovery operations.

BACKGROUND OF THE INVENTION

Due to the heterogeneity of subterranean formations, the acid fluids used in acidizing treatments enter the most permeable intervals which have the least resistance to flow, thereby increasing the permeability of those intervals and causing them to accept ever more acid. In order to improve acid displacement and prevent this uneven distribution of the acid, the acid must be diverted from most permeable intervals of the targeted formation into the less permeable or damaged intervals. In order to distribute the acid fluid evenly along the whole formation, generally one stage of acid fluid is pumped into the formation followed by a diverting agent stage (a diverting agent in the acid fluid) to temporarily plug off an interval of the formation where the previous stage acid fluid penetrated. Subsequently, the following stage acid fluid is forced into the other intervals of the formation. It is often important to use diverting agents for acid stimulation of long horizontal well bores.

Several materials have been utilized as diverting agents in acid stimulation treatments in the past. Oil-soluble naphthalene particles have been used as diverting agents. The problem with using oil-soluble diverting agents is that the chance of the diverting agents contacting oil produced from stimulated formations is very rare. The reacted acid fluid is physically in between the oil-soluble diverting agents and the formation oil. Foam has also been used as acid diverting agents, but it is very difficult to control the size distribution of the foams in downhole conditions for different permeability formations.

Other materials used as diverting agents in well bore treatments in the past have included graded phthalimide particles, polyester polymers, solid azo compounds having an azo component and a methylenic component, low molecular weight condensation products of hydroxyacetic acid with itself or with compounds containing other hydroxyl-, carboxylic-acid- or hydroxycarboxylic-acid moieties, and dispersions of water swellable crosslinked polymer particles. However, various problems exist in using these materials as acid diverting agents. The desired diverting materials will be stable in acid fluid and be easily removed from the formation after the treatment.

It would be desirable if a composition and method could be devised to overcome some of the problems in the conventional acid fluid diverting agents.

SUMMARY OF THE INVENTION

Accordingly, it is an object of the present invention to provide compositions and methods for diverting acid fluids in a subterranean formation that would effectively and temporarily divert acid fluids to less permeable portions of the formations.

It is another object of the present invention to provide acid fluid diverting agents for use in a subterranean formation, which agents would have solubility characteristics permitting them to be stable in the acid fluid, but allow them to be readily removed from the formation after treatment.

In carrying out these and other objects of the invention, there is provided, in one form, a method for diverting the flow of a second fluid in a subterranean formation that involves introducing into the subterranean formation a first fluid that includes at least one carrier fluid and at least one diverting agent, where the diverting agent is a solid, particulate dicarboxylic acid. This results in temporarily plugging off an interval of the formation with the diverting agent. Subsequently, the second fluid is introduced where intrusion of the second fluid into the interval is at least partially inhibited.

DETAILED DESCRIPTION OF THE INVENTION

It has been discovered that certain solid, particulate dicarboxylic acids provide excellent new diverting agents for acidizing stimulation of subterranean formations. These diverting agents are also called diversion agents or displacement agents. These new acid diverting agents include, in one non-limiting embodiment, dicarboxylic acids with formula molecular weights of from 146 to 400, inclusive, or a mixture of them. Alternatively, the dicarboxylic acids have formula molecular weights of from 160 to 230.

These acid diverting agents are preferably compatible with acids conventionally used in acidizing treatments including, but not necessarily limited to hydrochloric acid, formic acid, acetic acid, long-chained (e.g. $C_5$–$C_8$) organic acids, and mixtures thereof with hydrofluoric acid, or aminocarboxylic acids and their derivatives. The acid diverting agents of this invention are also expected to be compatible with most acid additives, including but not necessarily limited to, iron control agents, non-emulsifiers, corrosion inhibitors, and mutual solvents.

It is important that the solid dicarboxylic acids are insoluble in both aqueous and hydrocarbon liquids, but are highly soluble in regular mutual solvents or alcohol blends, which are usually added into the acid fluid to increase penetration. In the context of this invention, "insoluble" is defined as a solubility of less than 0.1 wt. % in the liquid of interest at room temperature of 70° F. (21° C.). Mutual solvents are defined herein as volatile solvents that are miscible with more than one class of liquids. In particular, mutual solvents may be understood as chemical additives for use in stimulation treatments that are soluble in oil, water and acid-based treatment fluids. They are routinely used in a range of applications, such as removing heavy hydrocarbon deposits, controlling the wettability of contact surfaces before, during and/or after a treatment, and preventing or breaking emulsions. Commonly used mutual solvents include, but are not necessarily limited to, glycol ethers such as ethylene glycol ethers which may include ethylene glycol monobutylether (EGMBE), ethylene glycol monoethyl ether, ethylene diglycol ether, diethylene glycol monobutyl ether, diethylene glycol monoethyl ether and the like; oxyalkylated alcohols, $C_2$–$C_4$ alcohols, such as 2-ethoxyethanol and the like, and mixtures thereof. Suitable alcohol blends include, but are not necessarily limited to, blends of the following alcohols: isopropanol and EGMBE and the like.

In one non-limiting embodiment of the invention, the diverting agents of this invention should be easily granulated or ground into different particle size distributions, for instance, a particle size from about 20 mesh to about 400 mesh (about 841 to about 38 microns), in another non-limiting embodiment from about 40 mesh to about 120 mesh (about 425 to about 125 microns). The dicarboxylic acid diverting agents of this invention have low toxicity and their melting points range from about 180 to about 300° F. (about 82 to about 149° C.), preferably from about 200 to about 250° F. (about 93 to about 121° C.). These diverting agents should have relatively low specific gravities, i.e. from 1.00 to 1.25, which makes them easy to suspend with regular acid fluids and low pumping rates.

Examples of particular solid dicarboxylic acids falling within the definitions of the invention include, but are not necessarily limited to, dodecanedioic acid, undecanedioic acid, decanedioic acid (sebacic acid), azelaic acid, suberic acid, and mixtures thereof. The dicarboxylic acid diverting agents of this invention are more readily available than the condensation products of U.S. Pat. No. 4,715,967. These products are low molecular weight condensation products of hydroxyacetic acid with itself or compounds containing other hydroxyl-, carboxylic acid-, or hydroxycarboxylic-acid moieties.

The carrier fluids or solvents useful to carry or suspend the diverting agents of the invention are any of the normal acidizing fluids. These may be generally described as mixtures of appropriate acids with any assortment of corrosion inhibitors, surface tension reducing agents, non-emulsifiers and brines and which would include any of the previously mentioned acids (e.g. HCl, HF, formic, acetic and long-chained organic acids).

It is difficult to specify in advance the proportion of diverting agent useful in the carrier fluid due to a number of complex, interrelated factors including, but not necessarily limited to, the particular acids used, the nature and permeability of the interval being treated, the temperature and pressure conditions of the formation, the particular diverting agent and carrier fluid used, the pumping rates employed, and the like. Nevertheless, in an effort to give some indication of appropriate proportions that may be used, in one non-limiting embodiment of the invention, the proportion of the diverting agent in the carrier fluid may range from about 0.5 to about 5 wt. %, and in an alternate embodiment from about 1 to about 2.5 wt. %.

Optional components useful in the first, diverting fluid include, but are not necessarily limited to, mixtures of appropriate acids with any assortment of corrosion inhibitors, surface tension reducing agents, non-emulsifiers and brines and the like.

In one non-limiting embodiment of the invention, the diverting agents of this invention are pumped with the acid fluid into the target zone to temporarily plug higher permeability areas and improve acid displacement in the entire zone. After the treatment, the diverting agents can be dissolved by the mutual solvents (or alcohol blend) in the acid fluid and/or pumping extra mutual solvents and/or melted at high temperatures. It will be appreciated that the method of the invention is considered successful only if intrusion of the second, acid fluid into the temporarily plugged interval is partially inhibited. That is, it is not necessary for the interval to be completely impenetrable by the acid fluid for the method to be effective.

The invention will now be further described with respect to more specific embodiments thereof for the purpose of further describing the invention and not to limit it in any way.

Table I shows the typical physical properties of two diverting agents of this invention. A series of laboratory tests (Tables II and III) show that the diverting agents can be successfully used to improve acid displacement in various reservoir conditions from 70° F. to 300° F. (21° C. to 149° C.), which is one expected, non-limiting temperature range. Diverting Agent A was a mixture of dodecanedioic acid, undecanedioic acid, sebacic (decanedioic) acid, azelaic acid, and suberic acid. Diverting Agent B was dodecanedioic acid.

TABLE I

Properties of Diverting Agents

| | Agent A | Agent B |
|---|---|---|
| Form | Flaked solid | Flaked solid |
| Melting point | 85–95° C. (185~203° F.) | 130° C. (266° F.) |
| Odor | Odorless | Odorless |
| Color | Color varies | White |
| Specific gravity | 1.02 | 1.15 |
| Water solubility | Very low (70° F. (21° C.)) | Very low (70° F. (21° C.)) 0.012% (140° F. (60° C.)) 0.01% (176° F. (80° C.)) 0.04% (212° F. (100° C.)) |

TABLE II

Solubility of Diverting Agents in Various Solvents

| | Solubility, % | |
|---|---|---|
| Solvent | Agent A | Agent B |
| Isopropanol | >20.47 (70° F. (21° C.)) | >9.73 (183° F. (84° C.)) |
| Ethylene glycol monobutyl ether (EGMBE) | 13.46 (70° F. (21° C.)) | 5.89 (183° F. (84° C.)) |
| Blend C (50:50 v/v isopropanol and oxyalkylated alcohol mixture) | 16.57 (70° F. (21° C.)) | 6.99 (183° F. (84° C.)) |

The schedule for the core flow tests reported in Table III was the following:

1) The core was saturated with 5% $NH_4Cl$ and mounted into a core holder.
2) The core was heated to the desired temperature while pumping 5% $NH_4Cl$ through the core with a 2 ml/min flow rate.
3) At the desired temperature, the initial permeability (perm) was measured with 5% $NH_4Cl$ in both the injection and production directions.
4) The acid diverting agent was then pumped to plug the core in the injection direction.
5) Two pore volumes of solvent were pumped, the surface of the plugged core was flushed, and 1 pore volume of solvent was pumped into the core in the injection direction.
6) The core was soaked for an hour.
7) The permeability was measured again with 5% $NH_4Cl$ in the production direction.

TABLE III

Core Flow Tests

| Core | Temp. °F. (°C.) | Acid Diverting Agent | Loading, lb/1000 gal (kg/m³) | Initial perm. (md) | Perm after plug (md) | Solvent (10%) | Final perm (md) | Regain perm (md) |
|---|---|---|---|---|---|---|---|---|
| 1 | 250 (121) | A | 167 (20.0) | 1820 | 4 | Blend C | 1850 | 102 |
| 2 | 150 (66) | A | 167 (20.0) | 210 | 20 | EGMBE | 151 | 72 |
| 3 | 120 (49) | A | 134 (16.1) | 1740 | 10 | Blend C | 1730 | 99 |
| 4 | 200 (93) | A | 134 (16.1) | 1020 | 8 | Blend C | 1022 | 100 |

From Table III it may be seen that the diverting agent of this invention effectively plugged the cores indicating that it would serve effectively as a diverting agent in the method of this invention. The reason the regain permeability for core 2 is different from the regain perm for the other three cores is possibly due to the slower dissolution rate in EGMBE compared to Blend C.

In the foregoing specification, the invention has been described with reference to specific embodiments thereof, and has been demonstrated as effective in providing solid, particulate diverting agents that can serve to temporarily plug intervals and thus act as successful diverting agents. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of diverting agents, carrier fluids, and other components falling within the claimed parameters, but not specifically identified or tried in a particular composition or under specific conditions, are anticipated to be within the scope of this invention.

We claim:

1. A method for diverting the flow of a second fluid in a subterranean formation comprising:
   introducing into the subterranean formation a first fluid comprising:
      at least one carrier fluid, and
      at least one diverting agent, where the diverting agent is a solid, particulate dicarboxylic acid that is insoluble in both aqueous liquids and hydrocarbon liquids, but is soluble in mutual solvents or alcohol blends;
   temporarily plugging off an interval of the formation with the diverting agent; and
   introducing the second fluid where intrusion of the second fluid into the interval is at least partially inhibited.

2. The method of claim 1 where the dicarboxylic acid has a melting paint from about 180 to about 300° F. (about 82 to about 149° C.).

3. The method of claim 1 where the dicarboxylic acid has a formula molecular weight of from 146 to 400.

4. The method of claim 1 where the solid, particulate dicarboxylic acid has a mesh size of from about 20 mesh to about 400 mesh (about 841 to about 38 microns).

5. The method of claim 1 where the dicarboxylic acid is selected from the group consisting of dodecanedioic acid, undecanedioic acid, decanedioic acid, azelaic acid, suberic acid, and mixtures thereof.

6. A method for diverting the flow of a second fluid in a subterranean formation comprising:
   introducing into the subterranean formation a first fluid comprising:
      at least one carrier fluid, and
      at least one diverting agent, where the diverting agent is a solid, particulate dicarboxylic acid, where the dicarboxylic acid is insoluble in both aqueous liquids and hydrocarbon liquids, but is soluble in mutual solvents or alcohol blends and where the proportion of diverting agent in the carrier fluid ranges from about 0.5 to about 5 wt. %;
   temporarily plugging off an interval of the formation with the diverting agent; and
   introducing the second fluid where intrusion of the second fluid into the interval is at least partially inhibited.

7. The method of claim 6 where the dicarboxylic acid has a melting point from about 180 to about 300° F. (about 82 to about 149° C.).

8. The method of claim 6 where the dicarboxylic acid has a formula molecular weight of from 146 to 400.

9. The method of claim 6 where the solid, particulate dicarboxylic acid has a mesh size of from about 20 mesh to about 400 mesh (about 841 to about 38 microns).

10. The method of claim 6 where the dicarboxylic acid is selected from the group consisting of dodecanedioic acid, undecanedioic acid, decanedioic acid, azelaic acid, suberic acid, and mixtures thereof.

11. A method for diverting the flow of a second fluid in a subterranean formation comprising:
   introducing into the subterranean formation a first fluid comprising:
      at least one carrier fluid, and
      at least one diverting agent, where the diverting agent is a solid, particulate dicarboxylic acid, where the dicarboxylic acid is insoluble in both aqueous liquids and hydrocarbon liquids, but is soluble in mutual solvents or alcohol blends, has a melting point from about 180 to about 300° F. (about 82 to about 149° C.) and a formula molecular weight of from 146 to 400, and where the proportion of diverting agent in the carrier fluid ranges from about 0.5 to about 5 wt. %;
   temporarily plugging off an interval of the formation with the diverting agent; and
   introducing the second fluid where intrusion of the second fluid into the interval is at least partially inhibited.

12. The method of claim 11 where the solid, particulate dicarboxylic acid has a mesh size of from about 20 mesh to about 400 mesh (about 841 to about 38 microns).

13. The method of claim 11 where the dicarboxylic acid is selected from the group consisting of dodecanedioic acid, undecanedioic acid, decanedioic acid, azelaic acid, suberic acid, and mixtures thereof.

* * * * *